United States Patent
Heidel et al.

(10) Patent No.: US 9,483,513 B2
(45) Date of Patent: Nov. 1, 2016

(54) STORING LARGE OBJECTS ON DISK AND NOT IN MAIN MEMORY OF AN IN-MEMORY DATABASE SYSTEM

(75) Inventors: Martin Heidel, Walldorf (DE); Michael Muehle, Walldorf (DE); Thorsten Glebe, Leimen (DE); Robert Schulze, Heidelberg (DE)

(73) Assignee: SAP SE, Walldorf (DE)

(*) Notice: Subject to any disclaimer, the term of this patent is extended or adjusted under 35 U.S.C. 154(b) by 538 days.

(21) Appl. No.: 13/460,803

(22) Filed: Apr. 30, 2012

(65) Prior Publication Data

US 2013/0290665 A1 Oct. 31, 2013

(51) Int. Cl.
*G06F 12/02* (2006.01)
*G06F 17/30* (2006.01)

(52) U.S. Cl.
CPC ................ *G06F 17/30318* (2013.01)

(58) Field of Classification Search
None
See application file for complete search history.

(56) References Cited

U.S. PATENT DOCUMENTS

| 7,979,400 B2* | 7/2011 | Barsness et al. ............. 707/662 |
| 8,489,811 B1* | 7/2013 | Corbett et al. ................ 711/114 |
| 2007/0168693 A1* | 7/2007 | Pittman ............... G06F 11/2092 714/4.11 |
| 2009/0268611 A1* | 10/2009 | Persson et al. ............... 370/230 |

* cited by examiner

*Primary Examiner* — Charles Rones
*Assistant Examiner* — Ryan Dare
(74) *Attorney, Agent, or Firm* — Mintz Levin Cohn Ferris Glovsky and Popeo, P.C.

(57) ABSTRACT

A method, computer program product and system are provided. The method, computer program product and system execute a process for determining a size of an object, the object having raw data that is operable upon by one or more physical operators. If the object is smaller than a threshold size, the object is stored in main memory of an in-memory database system. If the object is equal to or larger than the threshold size, the object is stored in a persistency of a disk storage, where storing the object in a disk storage further includes generating a global container identifier (ID) for the object, the global container ID referencing raw data of the object stored in the persistency of the disk storage.

12 Claims, 4 Drawing Sheets

STORING LARGE OBJECTS ON DISK AND NOT IN MAIN MEMORY OF AN IN-MEMORY DATABASE SYSTEM

TECHNICAL FIELD

The subject matter described herein relates to database management, and more particularly to systems and methods for storing large objects on disk and not in main memory.

BACKGROUND

An in-memory database system is a database system that primarily uses main memory for data storage. One example of an in-memory database system is the HANA in-memory database system provided by SAP AG of Walldorf Germany. As opposed to employing a disk storage mechanism for storing business data, in-memory database systems such as HANA use main memory, which is faster than disk-based databases since disk access and retrieval functions involve moving mechanical parts, which makes it much slower than main memory access. Accessing data in main memory reduces the input/output reading activity when querying the data, which in turn provides faster and more predictable performance than disk.

However, there are some scenarios where storing data to an in-memory database is not optimal. For example, a large object (LOB) can consume a large amount of memory space, and while the cost of in-memory solutions is continually decreasing, the storage and processing of some LOBs may slow down overall performance of the in-memory database system. For LOBs that consist of a number of megabytes or even gigabytes of data, storing LOBs to main memory is not appropriate since it might waste a lot of main memory. Therefore there is a need to ascertain when and under which parameters such LOB data is to be stored on disk.

SUMMARY

In one aspect, a method, computer program product and system are provided. The method, computer program product and system execute a process for determining a size of an object, the object having raw data that is operable upon by one or more physical operators. If the object is smaller than a threshold size, the object is stored in main memory of an in-memory database system. If the object is equal to or larger than the threshold size, the object is stored in a persistency of a disk storage, where storing the object in a disk storage further includes generating a global container identifier (ID) for the object, the global container ID referencing raw data of the object stored in the persistency of the disk storage.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide for the storage of large objects (LOBs) on disk, rather than inside the column and row structure in main memory.

Figure 1:
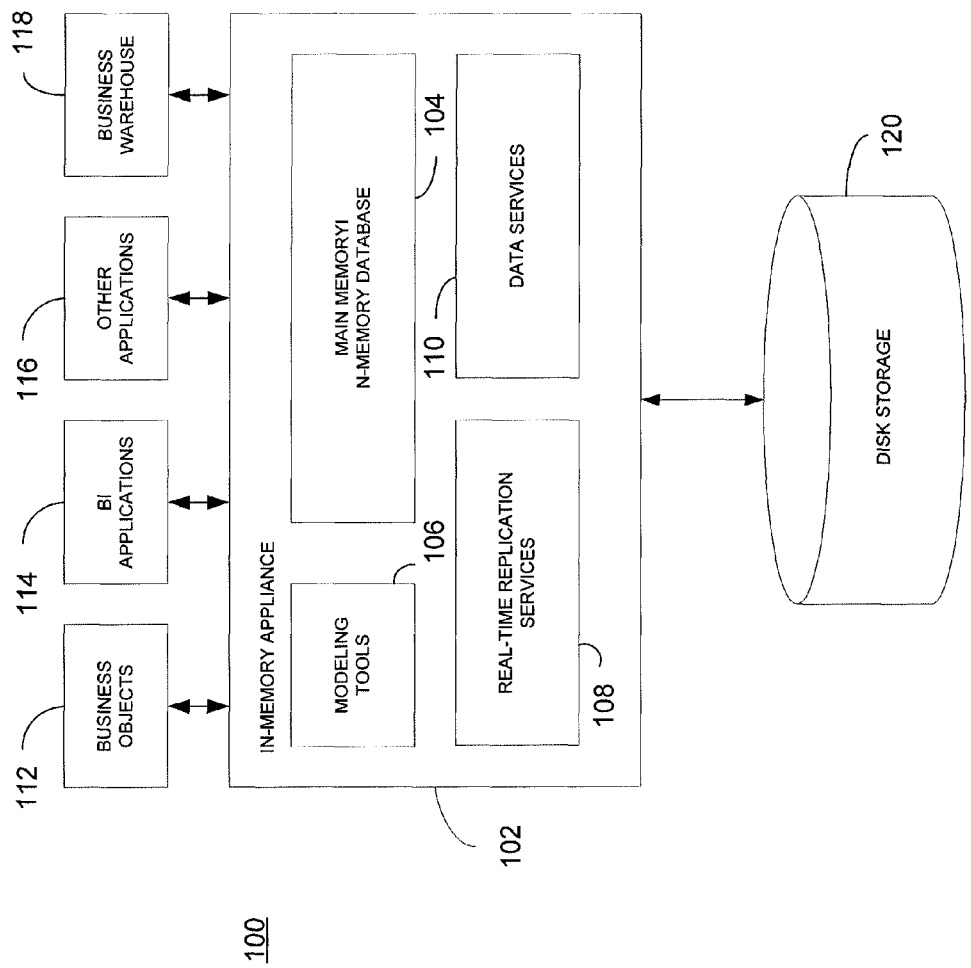
FIG. 1 is a diagram illustrating aspects of a system having one or more features consistent with implementations of the current subject matter.

FIG. 1 is a block diagram of an in-memory database system (IMDS) 100 that includes an in-memory appliance 102 having a main memory 104 that forms an in-memory database having a column and/or row structure, for fast storage, access and retrieval of business data. The main memory can be provided in silicon, such as random access memory. The in-memory appliance 102 of the IMDS 100 also includes modeling tools 106 for modeling any number of applications or visualizations of the data from the main memory 104, i.e. executing various business applications or the like, real-time replication services 108 and data services 110 for the business data received for storage by the in-memory appliance 102.

The in-memory appliance 102 can be a computing system such as a server, or a set of computing system distributed across a network. The in-memory appliance 102 receives data for storage according to one or more business objects 112, which can be retrieved and used by one or more business intelligence (BI) applications 114 or other applications 116. Other consumers of business data from the in-memory appliance 102 can be a business warehouse 118 or similar application framework.

The IMDS 100 further includes a disk storage 120 connected with the in-memory appliance 102. In some implementations, it is advantageous to store LOBs on the disk storage 120 rather than the column and row structure of the main memory 104, and according to techniques and processes described below, in order to achieve even further optimization of the IMDS 100.

In some in-memory database systems, a row and column store is available. Both can be used interchangeably for many various scenarios. When switching from one store to another, usually the contained data needs to be copied and reorganized since different data layouts are used (row oriented vs. column oriented). For LOBs this might become very expensive, but storing LOBs on disk is independent of the different memory layouts required for row and/or column store. Accordingly, there need only be a pointer to the files containing LOB data.

Column store updates of rows can be realized by duplicating all the data of the affected rows—even if most of the data doesn't change (this is needed for fast search over all columns). Storing a new or updated row requires writing all this data into main memory as well as into a database log for recovery after database failures. Large data put into main memory also requires larger database logs. In a disk-based approach, LOBs are stored just once, and can be referenced from column and/or row store—e.g. in case of an update, a given LOB might be referenced multiple times. Main memory consumption increases by the reference pointer to the file on disk, while the database log holds the data only once.

Since the column store supports partitioned tables that might be located on different hosts, different file storage (in HANA: persistency) can also be used to store the LOB files. If a row is moved from one table part to another, LOB data is not copied. The LOB data can be referenced from arbitrary hosts to any persistence in the landscape. Furthermore, temporal tables (i.e., history tables) are supported to contain LOB data. If a row is historicized and the LOB data does not change, e.g. by updates of some non-LOB fields, the very same large object is shared across the history part of a table and the most recent data part.

In accordance with some implementations, storing data on disk is preferable for document storage and text retrieval systems. Since some in-memory database systems provide a text retrieval system for fast document search and analysis, it will use the disk based LOB approach. The main data is then stored separate from the searchable index structure held in main-memory for fast access. In case the original document is requested by an application, the file data is retrieved and a more expansive disk access process is performed.

Figure 2:
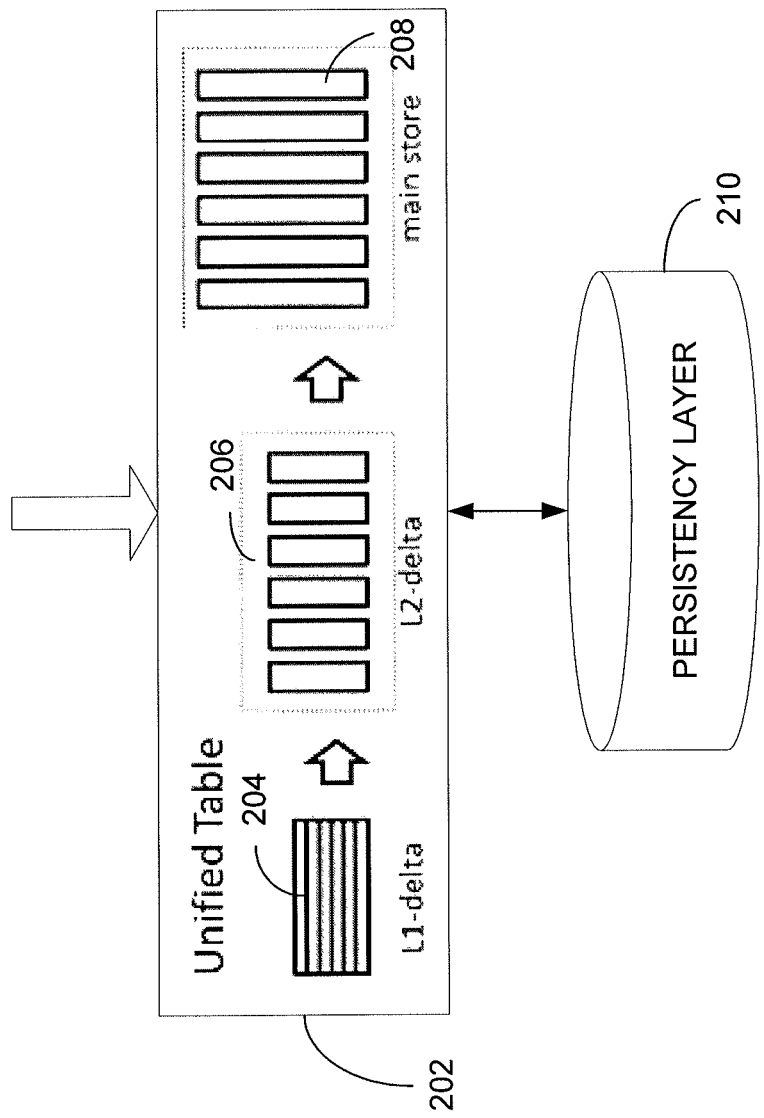
FIG. 2 is a illustrating aspects of a system showing features consistent with implementations of the current subject matter.

FIG. 2 illustrates a storage structure 200 that can be used with an in-memory database according to implementations of an LOB storage scheme. The storage structure includes a unified table structure 202 having a row store structures 204 for storing, as an example, level 1 delta data based on operations executed according to a number of physical operators. The unified table structure 202 can include column store structures 206 and 208, for storing level 2 data and main memory storage, respectively. The row 204 and column 206/208 store structures can store most of the business data used in any given application, however in accordance with some implementations, large object (LOB) business data is preferably stored in a disk persistency layer 210.

The persistency that stores LOBs is transactional, and the creation of LOB is also transactional-based. While using a column store technique for main memory, the storage structure supports split tables and temporal tables (i.e., history tables). Disk storage, however, supports distributed landscapes, so LOB data can be stored in a different persistency than where the table belongs.

The in-memory database system's disk layer is transactional aware, i.e., creating, updating and removing files are realized as atomic operations and can be rolled back in the case of errors. Disk-based LOBs make use of atomicity in two ways:

First, to track multiple references pointing to one LOB file, so-called reference-counting is used, and the file is stored along with a small integer counter on disk. Each new in-memory reference increases the counter by one. The LOB file is dropped if its reference count equals zero during its transaction commit. This can happen—but is not limited to—during drop table/column operations and delta merge operation in the column store.

Second, in addition to the reference counter, information about which tables/ column own a LOB file is stored with each LOB file. These "owner" identifiers (IDs) or references (OwnerIDs) are composed of a TableID and an AttributeID (column id). Each LOB file might have multiple OwnerIDs attached to it depending on the number of times it was inserted into some column. Storing the owners together with the LOB files provides an efficient garbage-collecting mechanism to remove orphaned LOB files just by scanning all LOB directories of the landscape and removing files that have no OwnerId. Additionally, drop table/column operations in distributed systems can be implemented very efficiently by using this technique.

In accordance with some implementations, LOB data is referenced by a GlobalContainerId consisting of a VolumeId of persistency and a ContainerId of the file. The VolumeID specifies the persistency where the file is stored, while the ContainerID references the file inside the persistency. The GlobalContainerID is stored in main memory, i.e. inside the row or column structures of main memory, instead of the raw data. This means LOB data itself is not touched for row updates or table movements across different hosts. To document these changes the GlobalContainerID, rather than plain data, is stored in the database log.

Operations of selects/updates containing LOB data are handled very efficiently. Whenever possible, only the GlobalContainerId is accessed, such that the associated data is not duplicated or held in main memory. There is no need to access and transmit the whole data. Until the data is actually needed to be accessed, it is sufficient to pass around GlobalContainerIDs. For accessing LOB data a common file interface is provided to stream read and write operations. Only the GlobalContainerId is copied inside main memory structures, and can be referenced multiple times.

In addition to "create" functions, the functions of updates and drops of LOB files use transactional visibility, including rollback in case of errors. These objects are shared across multiple tables/columns in the row and column store, but need multiple owner extension in disk storage. In some implementations, a mixed usage of in-memory and on disk storage is used for single columns. For example, small LOBs may be stored in-memory or in a special section of the disk or persistency. Larger LOBs of the same column are always stored on disk, as separate files.

For some scenarios it is difficult to determine whether to store data on disk or in main memory. This determination mainly depends on the data size and its access patterns. Accordingly, a mixed column approach can be implemented, where small data (some 100 Bytes) is still held in-memory, without a file on the disk being created, and larger data above this limit is kept on disk as described above. For the User/Application this is fully transparent. Advantages include fast access for small data, since it is held directly in main memory. Smaller data can easily be searched without round trips to the persistency that needs expensive file open, scan and close operations. Such techniques also reduce main memory consumption for LOBs above a predetermined threshold, which are to be stored on disk. In this latter case, an overhead for file access is acceptable since expansive main memory is not used.

Figure 3:
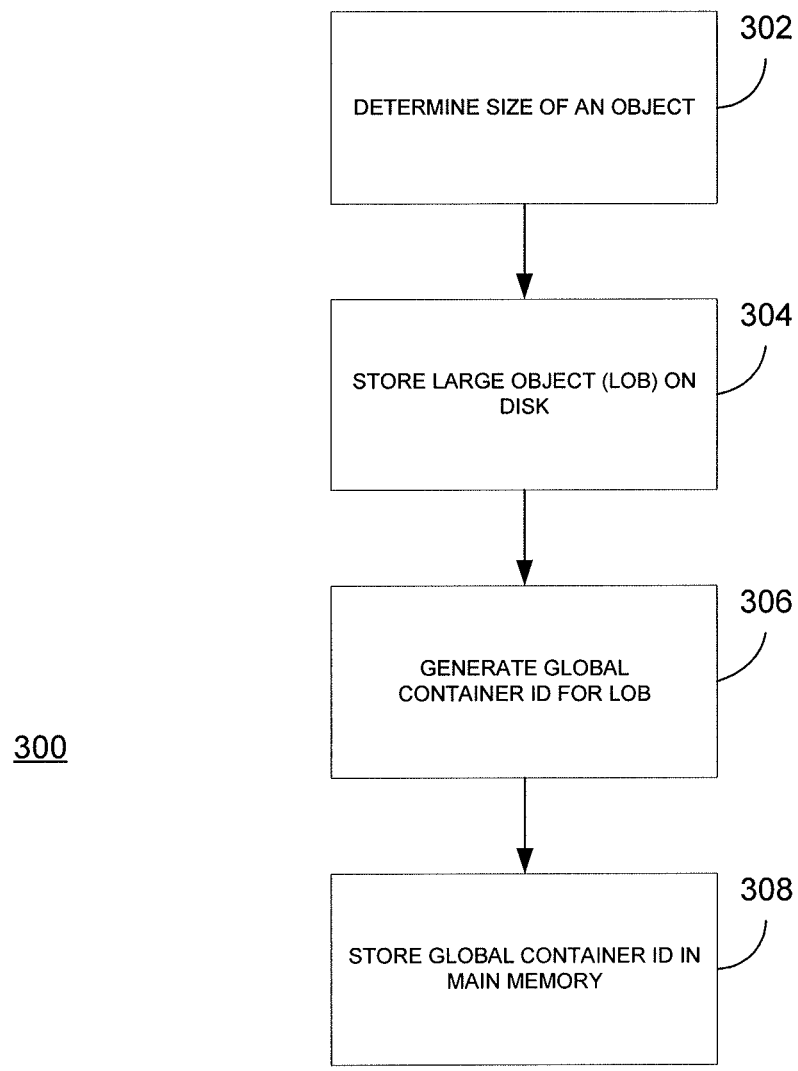
FIG. 3 is a flowchart of a method for storing LOB on disk rather than main memory.

FIG. 3 is a flowchart of a method 300 for storing LOB on disk rather than main memory. At 302, a size of an object is determined. At 304, if the object is of a large size or meets a predetermined threshold size to be classified as a LOB, the LOB is stored on disk. At 306, a global container ID is generated for the LOB, and at 308 the global container ID is stored in main memory.

Figure 4:
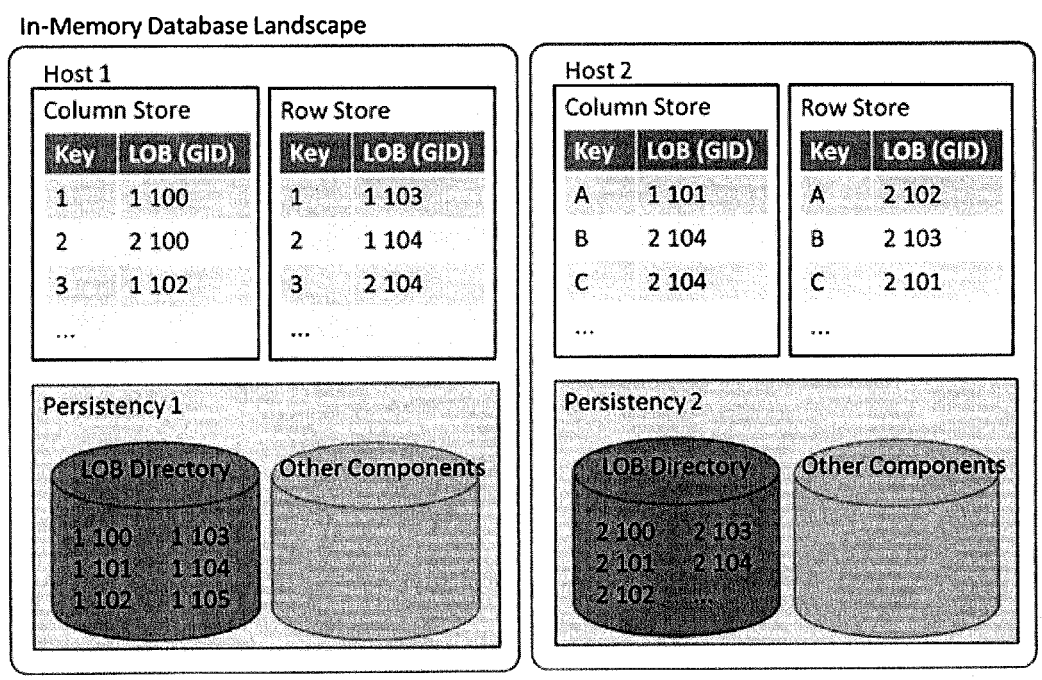
FIG. 4 illustrates a distributed landscape with two hosts running various LOB storage methods.

FIG. 4 illustrates a distributed landscape with two hosts running various LOB storage methods. Both hosts include a column store and row store, as well as a persistency, which includes a disk storage. Each persistency includes a dedicated LOB directory to store LOB data. Those of skill in the art would recognize that there are many other components of an in-memory database system that are not shown in FIG. 4.

In the example shown in FIG. 4, there are two different tables each per host and store. The LOB columns hold only the references (GlobalContainerID) and not the data. In the LOB directory, the data is kept represented by its VolumeID (=number of persistency) and its local ContainerID.

As can be seen, column and row store tables can reference LOB files from any persistency in the landscape. Also the same GlobalContainerID (GID) can be referenced more than once. Column store table on host 2 references file with GID=2 104. In the given example, an update of the key-column could have caused this situation. Also the same file is referenced by a row table on host 1. This is caused by an insert with a select statement where column table on host 2 was selected and filtered by key=C. Accordingly, storing LOB data to disk and not to main memory will improve overall performance and access speed of an in-memory database system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    determining a size of an object, the object having raw data that is operable upon by one or more physical operators;
    if the object is smaller than a threshold size, storing the object in main memory of a first host system of a plurality of host systems in an in-memory database system, the first host system including a first column store, a first row store and a first persistency associated with a first disk storage, the plurality of host systems further comprising a second host system that includes a second column store, a second row store and a second persistency associated with a second disk storage; and
    if the object is equal to or larger than the threshold size, storing the object in the first persistency, the storing of the object in the first persistency comprising generating a global container identifier (ID) for the object stored in the first persistency, the global container ID referencing raw data of the object stored in the first persistency, the global container ID including a volume ID specifying the first persistency where the object is stored and a container ID that references a file of a plurality of files inside the first persistency, the container ID being separate from the volume ID, the global container ID for the first host system being stored in the first column store and the first row store, the global container ID being allowed to be moved from the first row store to the second row store so that the second host system can access the object stored in the first persistency within the first host system.

2. The method in accordance with claim 1, wherein:
    the main memory of the first host system comprises the first column store and the first row store; and
    a main memory of the second host system comprises the second column store and the second row store.

3. The method in accordance with claim 1, wherein the global container ID of the object stored in the first persistency is stored in the first column store and the second column store so that the main memory of the first host system has access to the object stored in the first persistency.

4. The method in accordance with claim 1, wherein the object stored in the first persistency is accessed in response to a select operation specifying the global container ID.

5. A non-transitory computer program product comprising a machine-readable medium storing instructions that, when executed by at least one programmable processor, cause the at least one programmable processor to perform operations comprising:
    determine a size of an object, the object having raw data that is operable upon by one or more physical operators;
    if the object is smaller than a threshold size, store the object in main memory of a first host system of a plurality of host systems in an in-memory database system, the first host system including a first column store, a first row store and a first persistency associated with a first disk storage, the plurality of host systems further comprising a second host system that includes a second column store, a second row store and a second persistency associated with a second disk storage; and
    if the object is equal to or larger than the threshold size, store the object in the first persistency, the storing of the object in the first persistency comprising generating a global container identifier (ID) for the object stored in the first persistency, the global container ID referencing raw data of the object stored in the first persistency, the global container ID including a volume ID specifying the first persistency where the object is stored and a container ID that references a file of a plurality of files inside the first persistency, the container ID being separate from the volume ID, the global container ID for the first host system being stored in the first column store and the first row store, the global container ID being allowed to be moved from the first row store to the second row store, the global container ID in the second store allowing the second host system to access the object stored in the first persistency within the first host system.

6. The non-transitory computer program product in accordance with claim 5, wherein:
    the main memory of the first host system comprises the first column store and the first row store; and
    a main memory of the second host system comprises the second column store and the second row store.

7. The non-transitory computer program product in accordance with claim 5, wherein the global container ID of the object stored in the first persistency is stored in the first column store and the second column store so that the main memory of the first host system has access to the object stored in the first persistency.

8. The non-transitory computer program product in accordance with claim 5, wherein the object stored in the first persistency is accessed in response to a select operation specifying the global container ID.

9. A system comprising:
    at least one programmable processor; and
    a machine-readable medium storing instructions that, when executed by the at least one processor, cause the at least one programmable processor to perform operations comprising:
        determining a size of an object, the object having raw data that is operable upon by one or more physical operators;
        if the object is smaller than a threshold size, storing the object in main memory of a first host system of a plurality of host systems in an in-memory database system, the first host system including a first column store, a first row store and a first persistency associated with a first disk storage, the plurality of host systems further comprising a second host system that includes a second column store, a second row store and a second persistency associated with a second disk storage; and
        if the object is equal to or larger than the threshold size, storing the object in the first persistency, the storing of the object in the first persistency comprising generating a global container identifier (ID) for the object stored in the first persistency, the global container ID referencing raw data of the object stored in the first persistency, the global container ID including a volume ID specifying the first persistency where the object is stored and a container ID that references a file of a plurality of files inside the first persistency, the container ID being different from the volume ID, the global container ID for the first host system being stored in the first column store and the first row store, the global container ID being allowed to be moved from the first row store to the second row store so that the second host system can access the object stored in the first persistency within the first host system.

10. The system in accordance with claim 9, wherein:
the main memory of the first host system comprises the first column store and the first row store; and
a main memory of the second host system comprises the second column store and the second row store.

11. The system in accordance with claim 9, wherein the global container ID of the object stored in the first persistency is stored in the first column store and the second column store so that the main memory of the first host system has access to the object stored in the first persistency.

12. The system in accordance with claim 9, wherein the object stored in the first persistency is accessed in response to a select operation specifying the global container ID.

* * * * *